United States Patent [19]

Stecher et al.

[11] 4,382,247
[45] May 3, 1983

[54] PRESSURE SENSOR

[75] Inventors: Günther Stecher, Ludwigsburg; Kurt Spitzenberger, Weilder Stadt; Klaus Müller, Tamm, all of Fed. Rep. of Germany

[73] Assignee: Robert Bosch GmbH, Stuttgart, Fed. Rep. of Germany

[21] Appl. No.: 181,839

[22] Filed: Aug. 27, 1980

[30] Foreign Application Priority Data

Mar. 6, 1980 [DE] Fed. Rep. of Germany ....... 3008572
Mar. 14, 1980 [DE] Fed. Rep. of Germany ....... 3009811

[51] Int. Cl.$^3$ ............................................ H01L 10/10
[52] U.S. Cl. ............................................ 338/42; 338/4
[58] Field of Search ............... 338/4, 42; 73/719–721, 73/725–727; 25/610.8 G

[56] References Cited

U.S. PATENT DOCUMENTS

| | | | |
|---|---|---|---|
| 3,455,165 | 7/1969 | Huet | 338/42 X |
| 4,040,172 | 8/1977 | Kurtz | 338/4 X |
| 4,079,508 | 3/1978 | Nann | 338/2 X |
| 4,127,840 | 11/1978 | House | 338/42 X |

*Primary Examiner*—C. L. Albritton
*Attorney, Agent, or Firm*—Frishauf, Holtz, Goodman & Woodward

[57] ABSTRACT

A deformable membrane is made by applying, by thick-film technology, a glass-ceramic paste over a vaporizable or burnable filler material, containing primarily carbon black in a binder which, in turn, is located on a substrate, for example of ceramic, glass, enameled metal or the like. The substrate for example is about 1.5 cm square, the membrane glass ceramic being applied as a circular dot of about 0.5 cm diameter. After solidifying the paste forming the membrane in a protective gas atmosphere, for example at about 950° C., the filler is burned out in an oxidizing atmosphere, to escape through pores in the membrane material. By selecting a membrane material which has a lower thermal coefficient of expansion than that of the substrate, after burning, the membrane will assume a convex shape leaving a hollow space (8) beneath it and the substrate. The membrane is pressure-sensitive, for example when a predetermined quantity of a predetermined gas under a predetermined pressure is sealed therein, or if access to the interior of the space is provided through the substrate, for example by a tiny duct which is connected to a flange or stub connection. Electrical output can be obtained by applying either a metallic layer cover the membrane and utilizing the capacity of the metallic layer with respect to a counter electrode, or applying strain-compression sensitive resistors on the membrane. The membrane, after the electrodes or resistors are applied, is coated with a protective glass glaze (6). The pressure transducer is particularly for determining the pressure conditions in the induction pipe of an internal combustion engine.

16 Claims, 5 Drawing Figures

PRESSURE SENSOR

The present invention relates to a pressure sensor, and more particularly to a diaphragm-pressure sensor which is especially suitable for use in combination with internal combustion engines, typically automotive-type internal combustion engines, and which is of small size, e.g. has a sensing element of about 0.5 in diameter.

BACKGROUND AND PRIOR ART

Sensors to determine pressure, which may be above or below atmospheric, are frequently used in combination with internal combustion engines, and particularly with mobile internal combustion engines installed in automotive vehicles. Hereinafter, the term "pressure" is intended to mean any pressure other than ambient and the sensor, therefore, is equally suitable to measure pressure below atmospheric, that is, vacuum, or pressure above atmospheric.

Automotive-type pressure sensors require structures which are are small and which are reliable over long operating periods, providing reproducible electrical output signals representative of the pressures being sensed. A typical pressure is induction pipe pressure—or, rather, vacuum—which is to be transduced into electrical signals, to be used to control the operation of the internal combustion (IC) engine. These signals, after suitable transformation, are then applied to control systems where they are further processed to control the operation of the engine.

THE INVENTION

It is an object to provide a pressure sensor which is small, reliable, and suitable for use with an internal combustion engine.

Briefly, a substrate has a pressure-deformable membrane applied thereto in which the membrane is very thin, and constructed by thick-film technology. Typically, the membrane is made of a glass-ceramic substance, having a thickness of between about 0.02 to 0.3 mm, preferably about 0.1 mm. The substrate may be ceramic, glass, or an enameled metal, preferably in form of a small plate over which the thick-film membrane is applied, leaving a hollow space beneath the membrane and the substrate.

Resistor elements can be applied to the membrane which change resistance upon deformation thereof; or electrodes can be applied to the membrane and the substrate to provide a variable capacity capacitor, the capacity of which changes with change in pressure, which, likewise, can be evaluated in an evaluation circuit, preferably a bridge circuit. The resistors applied to the membrane, if this embodiment is used, can be applied by thin-film technology or thick-film technology.

DRAWINGS

Figure 1:
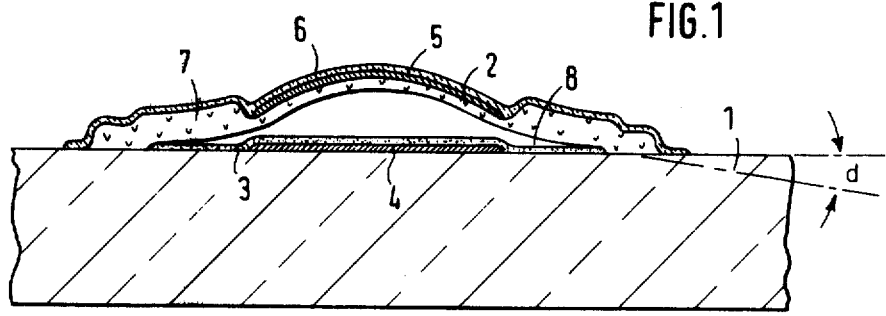
FIG. 1 is a highly schematic cross-sectional view through a pressure sensor in accordance with the invention, in which changes in pressure are evaluated by sensing a change in capacity.

Embodiment of FIG. 1: A substrate 1, of about 1.5 cm$^2$, made of ceramic, glass or a metal plate which is enameled at its top side, has a metal layer 4 applied thereover. The metal layer 4 can be applied by printing and firing a metal coating, in well known thick-film technology. Other ways to apply the metal layer 4 are by vapor deposition, for example. The application of the metal coating or layer 4 is not critical and any suitable method may be used.

A membrane 2 covers the metal layer 4 and includes beneath the membrane an open or hollow space 8. The membrane 2 is approximately 0.06 mm thick, is essentially circular in plan view (see FIG. 4) and has a diameter of about 0.5 cm. It is made of a ceramic material, preferably a glass-ceramic which is applied as a paste by screen printing. To maintain the space 8 between the membrane 2 and the metal coating 4, a filler 3 is applied by printing. The filler 3 includes, for example, carbon black or soot, with organic additives. A subsequent sintering step, carried out at a temperature of about 950° C. in a protective gas atmosphere prevents combination of the ceramic material which forms the membrane 2, and applied over the filler with the substrate 1; at the same time, the ceramic material of the membrane 2 is sintered together to a sturdy but deformable mass or layer.

In a subsequent firing step in an oxidizing atmosphere, the filler 3 is completely incinerated or combusted, without residue. It is important that the membrane 2 of the glass-ceramic material has a porosity which is not too small, and is thin enough to permit escape of the volatile components of the filler 3 upon incineration thereof through the pores of the membrane 2. Subsequently, additional printing steps and firing steps are carried out in order to reinforce and strengthen the membrane and bring it to the desired thickness. An amorphous glass layer 6, applied as a subsequent layer, closes off the space 8 in gas-tight and air-tight manner.

If the membrane 2 uses a material which has a thermal coefficient of expansion which is less than that of the substrate 1, the membrane, after the firing step, will have a convex dome shape, bulging or bowing away from the substrate 1. The resulting structure, due to the prestressing of the membrane in the shape as approximately shown in FIG. 1, can thus be used to measure vacuum or under-pressure. Further, the particular shape of the membrane insures that the membrane will be continuously under compressive force. Tension forces or tension strains within the membrane should be avoided since, as well known, ceramic or glass-type masses are much less resistant to tension forces.

The edge zone 7 of the membrane 2 is preferably thickened. Thickening the edge zone 7 will result in bulging of the periphery of the membrane 2 by a very small angle $\alpha$, which substantially increases the strength and hence the time of use of the membrane 2 in operation upon movement of the membrane when pressure changes result. In cross section, membrane 2 has a concave-convex undulating or S-shape.

Figure 4:
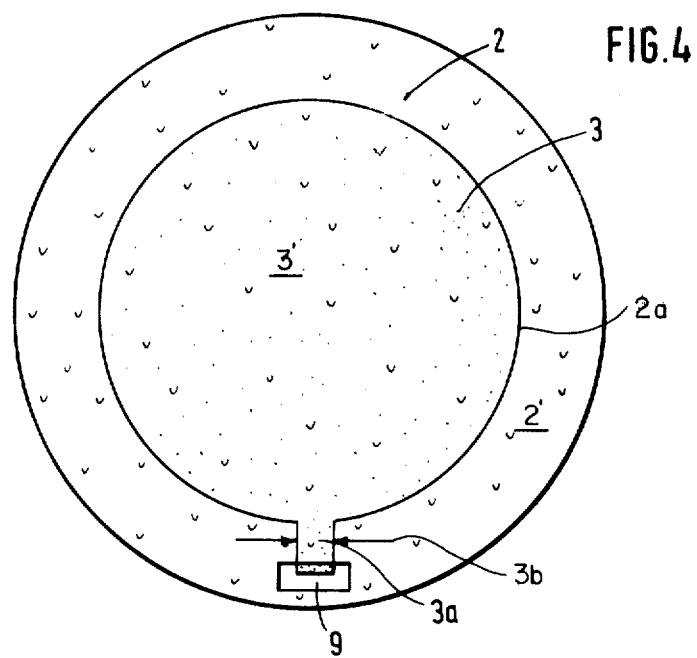
FIG. 4 is a highly schematic top view of the sensor during one stage of its manufacture.

FIG. 4 illustrates how the membrane diaphragm chamber can be evacuated, or filled with a predetermined gas at a predetermined pressure. When applying the filler 3 in a central zone 3' of substrate within a boundary 2a which separates the central zones 3' from a boundary zone 2', for example by printing, a projecting tongue 3a is additionally formed, terminating short of the outer circumference of the material of the membrane 2 i.e., within boundary zone 2'. The membrane 2, itself, is not printed in the rectangle 9, for example by masking this area. After burning off the filler 3, the region 3a will form a tunnel through which also combustion gases can escape. After the membrane has been made, and for example after the entire structure has been made, including application of electrodes, resistances, and the like, the unit is introduced into a separate furnace having a predetermined gas atmosphere therein at a predetermined gas pressure. By melting-on a glass-containing paste, the region 9 is closed, thus entrapping a portion of the atmosphere within the furnace under that pressure in the chamber. Of course, since the volume is constant, the pressure will change as the temperature changes and due allowance should be made for the operating range of the element when determining the pressure in the furnace.

The embodiment of FIG. 1 illustrates a pressure-sensitive capacitor. The membrane 2 is deformable and subjected to under or over-pressure—with respect to ambient pressure. A conductive area 5, for example in strip or circular form, is applied to the membrane to form one electrode of a capacitor, the other electrode of which is formed by the metal layer 4. The capacity of the capacitor increases with increasing pressure on the membrane 2 since, thereby, the distance between the conductive area 5 and the metal layer 4 is decreased.

Figure 2:
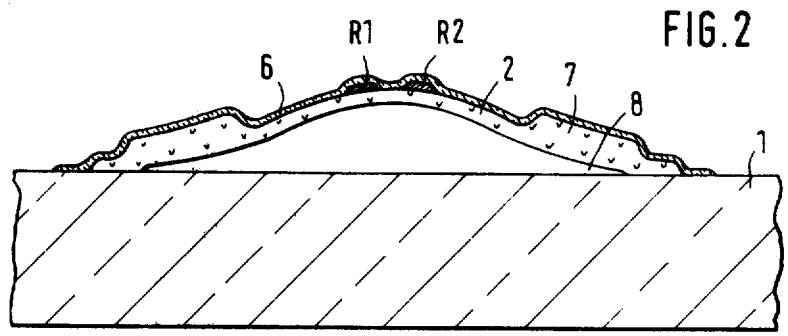
FIG. 2 is a view similar to FIG. 1 in which changes in pressure are evaluated by change in resistance of strain-sensitive resistors.

The embodiment of FIG. 2 illustrates an arrangement in which the pressure sensor operates with deformation resistance transducers. The free-standing, self-supporting glass-ceramic membrane 2 has applied thereto in sequence conductive tracks, resistance tracks, and glass or ceramic layers. They may be applied by printing and subsequent firing as well known in thick-film technology. In the example illustrated, the membrane 2 has two resistors R1, R2 applied thereover, connected to suitable conductive tracks. The resistors are covered by a glaze or glass coating 6.

The two resistors R1, R2 are either stretched or compressed upon change of air pressure acting on the membrane 2. Consequently, the electrical resistance of a suitable thick-film resistor will change appreciably. Connecting the resistors R1, R2 into a bridge circuit as shown in FIG. 3, that is, into diametrically opposite branches of the bridge with two resistors R3, R4, permits easy and accurate evaluation of the change in resistance.

Figure 3:
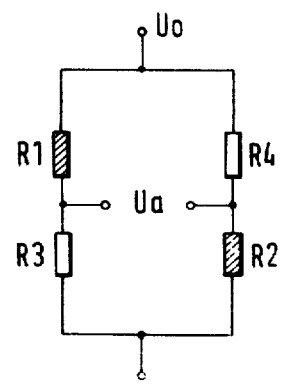
FIG. 3 is a highly schematic circuit diagram of a bridge connection for use with the sensor of FIG. 2.

The bridge circuit—see FIG. 3—has the substantial advantage that the resistors R3, R4 which are external to the membrane, and not located thereon, can be adjusted or calibrated by means of laser beams while the transducer diaphragm cell is in an atmosphere with a predetermined pressure. Thus, calibration can be easily achieved. This has substantial advantages in production, since the output voltage Ua can be calibrated independently of the pressure within the chamber 8 and the strain condition of the membrane 2 in simple and rapid manner.

Figure 5:
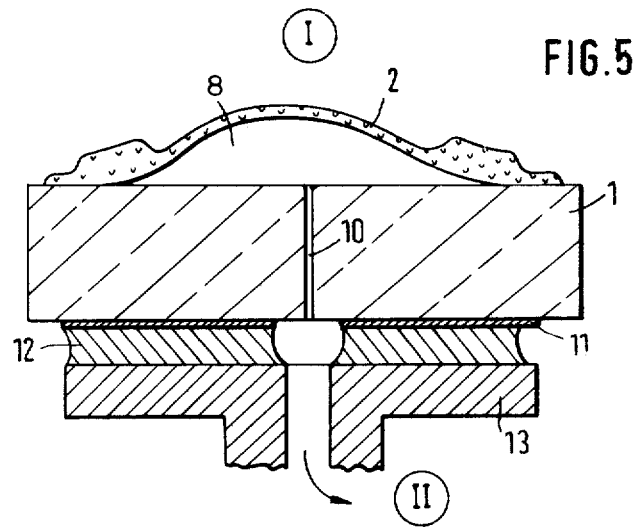
FIG. 5 is a view similar to FIG. 1, illustrating another embodiment.

The pressure sensor can also be used to measure differential pressure between two areas or spaces I, II, each including a gaseous atmosphere. FIG. 5 illustrates such an arrangement in which a fine bore 10 is placed through the substrate 1 beneath the membrane 2 to communicate with the interior 8 beneath the membrane. To connect the bore 10 to an external connection duct, the back side of the substrate has a metallization 11 applied thereto on which, by means of solder 12, a stub flange is connected in gas-tight manner. It is here assumed that the substrate 10 and, if necessary, also the flange 13 and the respective connections thereto, separate the atmospheric spaces I and II, only schematically indicated in FIG. 5.

The pressure sensor has these advantages: The actual sensing elements, resistors or capacitor electrodes, are reliably integrated on the membrane of the pressure sensor. Transfer elements which transfer deflection of the membrane to further electrodes, thus, are eliminated, thus in turn also eliminating a source of malfunction and error.

The pressure sensor, with the sensor elements, is integrated on a substrate which can carry further electrical circuit elements, applied thereto in any well known manner, for example in thick-film hybrid technology.

The pressure sensor is miniaturized.

All steps in the manufacture of the sensor are carried out at high temperatures, that is, in the range of between 500° C. to 950° C. This renders the sensor essentially immune to high temperatures during operation, so that the sensor can be used in high-temperature applications and to sense pressures of fluids at elevated temperature.

The method of making the sensor by thick-film technology can be automated, and thus the manufacturing costs are low. The material costs themselves are practically negligible.

Various changes and modifications may be made, and features described in connection with any one of the embodiments may be used with any of the others, within the scope of the inventive concept.

In a typical example, the substrate 1 was a plate of 1.5 cm square, made of 96% $Al_2O_3$—ceramic having a thickness of 0.62 mm a metal coating 4 of Palladium-Silver is applied by thick film deposition, to have a thickness of about 0.010 mm. The filler 3 included a primary constituent of carbon black and a polyesterresin of isophthalic acid solved in terpineol and styrol and additives. Carbon, resin, solvents and additives are mixed to proportions by weight of about 10/40/40/10 percent. The filler was applied in a circle of just under 0.5 cm diameter, with a small projection 3a (FIG. 4) of 2 mm length; 0.6 mm width 3b, the end of which was masked in approximately the proportion and configuration as shown in FIG. 4. Over the filler on the substrate, a paste with about 0.5 cm diameter was applied, the paste being a ceramic material consisting of a $PbO/B_2O_3/SiO_2$-glass and a $Al_2O_3$-filler. A commercial available material for example is dielectric 9949 (Du Pont de Nemours INC., Wilmington, DE 19898).

The subassembly was then sintered at a temperature of 950° C. in a protective gas atmosphere utilizing nitrogen as the protective gas.

For further details of this process, reference is made to the referenced application.

The filler 3 was then burned off at 700° C. in an oxidizing atmosphere.

Thereafter, one additional layer, of about 0.04 mm thickness was sequentially applied over the membrane 2, consisting of essentially the same material as that originally used and subjected to a firing step at 900° C., in a air atmosphere to melt the membrane together and to give the membrane the shape shown in FIG. 1, with the thickened portion 7 and the angle α. The thickened portions 7 were applied in additional sequential thick-film printing steps, to result in a thickness of about 0.09 mm.

Depending on the transducing mode selected—capacitative (FIG. 1) or by resistance change (FIG. 2), a metal coating 5 was then deposited over the membrane 2; or, respectively, two resistance layers, each layer consisting of Bismutruthenatglass of 0.01 mm thickness was applied over the layer 2. After firing again in a air atmosphere at 850° C., to bond the structure together, a glaze 6 was applied thereover having a thickness of about 0.01 mm and comprising Nr. 4011 C sealing glass.* Glaze 6 was fired at a temperature of 550° C. in a air atmosphere. Diameter of duct 10: 0.08 mm.

*A commercial available material of Electro-Sciene-Laboratories INC., Pennsauken, N.J. 08110.

Further reference for application of the respective layers by thick-film technology may be had to: Charles Harper (Ed.), Handbook of Thick Film Hybrid Microelectronics, Chapter 5 to 7, McGraw-Hill, 1974.

We claim:

1. Pressure transducer, particularly to determine the pressure conditions in the induction pipe of an internal combustion engine, having
a membrane (2) secured to a substrate (1) and defining a chamber (8) between the membrane and the substrate,
wherein, in accordance with the invention,
the substrate (1) comprises at least one of the materials selected from the group consisting of ceramic, glass, enameled metal;
said substrate defines a boundary zone (2') and a central zone (3') within said boundary zone;
and the membrane (2) comprises a solidified layer applied by thick-film technology which is bonded to the boundary zone (2') of the substrate and is bulged upwardly from the substrate in the central zone (3') within said boundary zone,
said membrane being a bowed dome structure prestressed in compression, and
comprising a material having a lower temperature coefficient of expansion than the temperature coefficient of expansion of the substrate.

2. Transducer according to claim 1, wherein the substrate (1) is a plate-like structure.

3. Pressure transducer, particularly to determine the pressure conditions in the induction pipe of an internal combustion engine, having
a membrane (2) secured to a substrate (1) and defining a chamber (8) between the membrane and the substrate,
wherein, in accordance with the invention,
the substrate (1) defines a boundary zone (2') and a central zone (3') within said boundary zone;
and the membrane (2) comprises a solidifed layer applied by thick-film technology which is bonded to the boundary zone (2') of the substrate and is bulged upwardly from the substrate in the central zone (3') within said boundary zone,
said membrane being a bowed dome structure prestressed in compression, and
comprising a glass ceramic having a thickness of between about 0.02 to 0.3 mm, and having a lower temperature coefficient of expansion than the temperature coefficient of expansion of the substrate.

4. Transducer according to claim 3, wherein the membrane has a thickness of about 0.1 mm.

5. Transducer according to claim 3, wherein the substrate (1) is a plate-like structure and comprises at least one of the materials selected from the group consisting of: ceramic, glass, enameled metal.

6. Transducer according to claim 1 or 3, wherein the substrate (1) is essentially plate-like;
in cross section, is approximately S-shaped and being concave adjacent the boundary zone where the membrane is bonded to the substrate and convex at a central portion thereof.

7. Transducer according to claim 6, wherein the portion of the membrane adjacent the boundary zone is thickened with respect to the remaining portion of the membrane.

8. Pressure transducer, particularly to determine the pressure conditions in the induction pipe of an internal combustion engine, having
a membrane (2) secured to a substrate (1) and defining a chamber (8) between the membrane and the substrate,
wherein, in accordance with the invention,
the substrate (1) defines a boundary zone (2') and a central zone (3') within said boundary zone;
and the membrane (2) comprises a solidified layer applied by thick-film technology which is bonded to the boundary zone (2') of the substrate and is bulged upwardly from the substrate in the central zone (3') within said boundary zone,
said membrane being a bowed dome structure prestressed in compression, and
comprising a material having a lower temperature coefficient of expansion than the temperature coefficient of expansion of the substrate,
and wherein the chamber (8) has an extension portion (3a) to permit controlling the pressure and gas composition within the chamber (8) beneath the membrane, said extension portion being melted closed, said chamber retaining a fill of predetermined consistency and pressure.

9. Transducer according to claim 1 or 3, further including a metallic electrode (5) applied to the outside of the membrane to form a capacitor electrode.

10. Transducer according to claim 9, further including a metal coating (4) positioned on the substrate and opposite said electrode (5) on the membrane to form a second electrode of a capacitor.

11. Transducer according to claim 9, further including a glass glaze (6) applied over the outside of the metallic electrode (5), the membrane (2) and at least adjacent portions of the substrate (1).

12. Transducer according to claim 1 or 3, further including at least one deformation-sensitive resistor (R1, R2) secured to the membrane (2) and changing resistance upon deformation of the membrane.

13. Pressure transducer, particularly to determine the pressure conditions in the induction pipe of an internal combustion engine, having
a membrane (2) secured to a substrate (1) and defining a chamber (8) between the membrane and the substrate,
wherein, in accordance with the invention,
the substrate (1) defines a boundary zone (2') and a central zone (3') within said boundary zone;
and the membrane (2) comprises a solidified layer applied by thick-film technology which is bonded to the boundary zone (2') of the substrate and is bulged upwardly from the substrate in the central zone (3') within said boundary zone, said membrane being a bowed dome structure prestressed in compression, and
comprising a material having a lower temperature coefficient of expansion than the temperature coefficient of expansion of the substrate;
and further including a glass glaze (6) covering the membrane (2) and at least an adjacent portion of the substrate (1).

14. Transducer according to claim 12, further including a glass glaze (6) covering said at least one resistor (R1), the remainder of the outside of the membrane (2) and at least adjacent portions of the substrate (1).

15. Transducer according to claim 12, wherein said at least deformation-sensitive resistor (R1, R2) comprises a thin film resistor.

16. Transducer according to claim 12 wherein said at least one deformation sensitive resistor (R1, R2) comprises a thick film resistor.

* * * * *